United States Patent
Nakaie et al.

(10) Patent No.: US 8,199,180 B2
(45) Date of Patent: Jun. 12, 2012

(54) OPTICAL SCANNER AND IMAGE FORMING DEVICE

(75) Inventors: Katsuhiko Nakaie, Kanagawa (JP); Hideki Kashimura, Kanagawa (JP); Yoshinori Makishima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 86 days.

(21) Appl. No.: 12/796,122

(22) Filed: Jun. 8, 2010

(65) Prior Publication Data

US 2011/0115870 A1    May 19, 2011

(30) Foreign Application Priority Data

Nov. 17, 2009  (JP) .................................. 2009-262121

(51) Int. Cl.
*B41J 15/14* (2006.01)
*B41J 27/00* (2006.01)

(52) U.S. Cl. ...................................... 347/241; 347/256

(58) Field of Classification Search .................. 347/230, 347/241–245, 256–261, 263
See application file for complete search history.

(56) References Cited

U.S. PATENT DOCUMENTS

| 5,638,189 A * | 6/1997 | Yanagisawa ................... 358/481 |
| 6,271,869 B1 * | 8/2001 | Tada et al. ...................... 347/116 |
| 6,756,583 B2 * | 6/2004 | Yamawaki .................... 250/234 |
| 2009/0322846 A1 * | 12/2009 | Kashimura ................... 347/129 |

FOREIGN PATENT DOCUMENTS

| JP | 11014931 A | * | 1/1999 |
| JP | 2005309301 A | * | 11/2005 |
| JP | A-2005-309301 |  | 11/2005 |
| JP | A-2010-8605 |  | 1/2010 |

\* cited by examiner

*Primary Examiner* — Hai C Pham
(74) *Attorney, Agent, or Firm* — Oliff & Berridge, PLC

(57) ABSTRACT

An optical scanner includes: a light source that emits plural laser-beams; a deflecting section that deflects the laser-beams; a first optical-element that reflects the laser-beams deflected at the deflecting section and converges the laser-beams in a slow-scanning direction, and that can adjust positions, in the slow-scanning direction, of the laser-beams that the first optical-element reflects; a second optical-element that converges, in the slow-scanning direction, the laser-beams reflected at the first optical-element, and that can adjust scan line tilt of the laser-beams that the second optical-element reflects; and a planar reflecting member provided on an optical path between the first and second optical-elements, and reflects, toward the second optical-element, the laser-beams converged in the slow-scanning direction, the reflecting member having an adjusting mechanism that can adjust an angle of incidence in the slow-scanning direction of the laser-beams that are incident on the second optical-element.

9 Claims, 10 Drawing Sheets

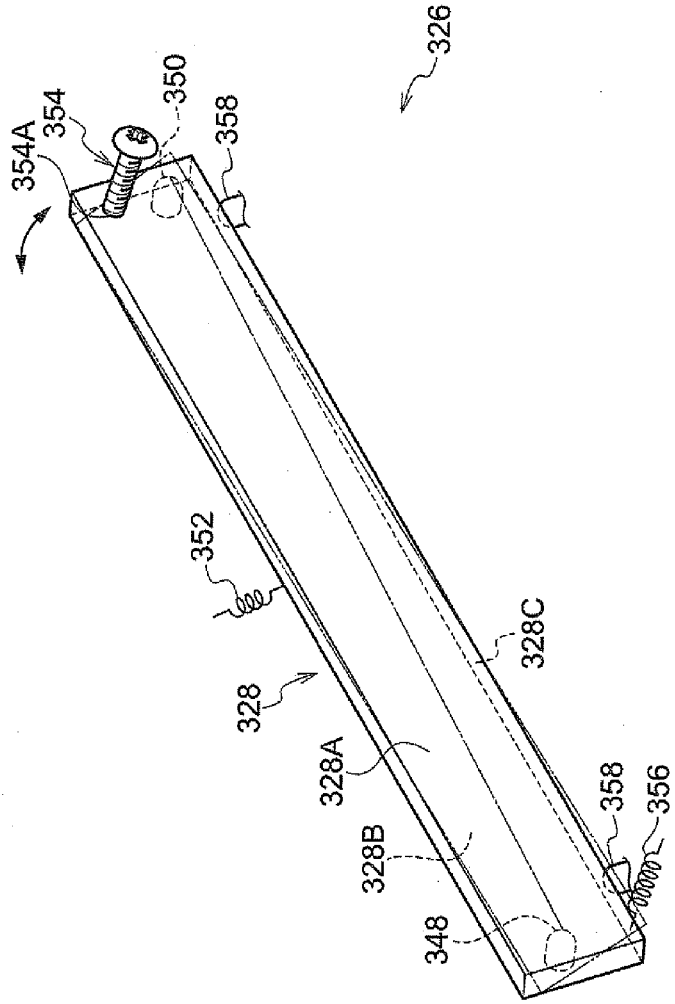
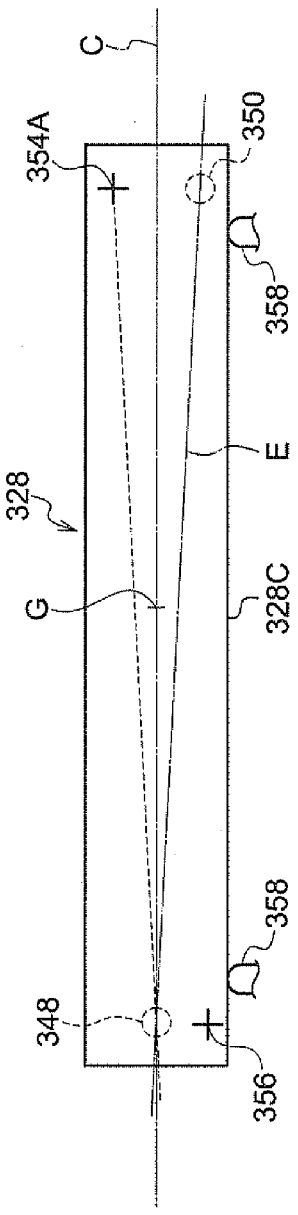
FIG. 1A
FIG. 1B

OPTICAL SCANNER AND IMAGE FORMING DEVICE

CROSS-REFERENCE TO RELATED APPLICATION

This application is based on and claims priority under 35 USC 119 from Japanese Patent Application No. 2009-262121 filed on Nov. 17, 2009.

BACKGROUND

Technical Field

The present invention relates to an optical scanner and an image forming device.

SUMMARY

An optical scanner of an aspect of the present invention includes: a light source that emits plural laser beams; a deflecting section that includes reflecting surfaces on each of which the plural laser beams emitted from the light source are incident, and that moves the reflecting surfaces to deflect the laser beams that are incident on the reflecting surface; a first optical element that reflects the plural laser beams deflected at the reflecting surface of the deflecting section and converges the laser beams in a slow scanning direction, and that can adjust positions, in the slow scanning direction, of the laser beams that the first optical element reflects; a second optical element that converges, in the slow scanning direction, the laser beams reflected at the first optical element, and that can adjust scan line tilt of the laser beams that the second optical element reflects; and a reflecting member that is planar and is provided on an optical path between the first optical element and the second optical element, and reflects, toward the second optical element, the laser beams converged in the slow scanning direction by the first optical element, the reflecting member having an adjusting mechanism that can adjust an angle of incidence in the slow scanning direction of the laser beams that are incident on the second optical element.

BRIEF DESCRIPTION OF THE DRAWINGS

An exemplary embodiment of the present invention will be described in detail based on the following figures, wherein:

FIG. 1A is a perspective view showing a reflecting mirror and the like that are employed in an optical scanner relating to an exemplary embodiment of the present invention;

FIG. 1B is a front view showing the reflecting mirror and the like that are employed in the optical scanner relating to the exemplary embodiment of the present invention;

DETAILED DESCRIPTION

Examples of an optical scanner and an image forming device relating to an exemplary embodiment of the present invention are described in accordance with FIG. 1 through FIG. 10.

(Overall Structure)

Figure 10:
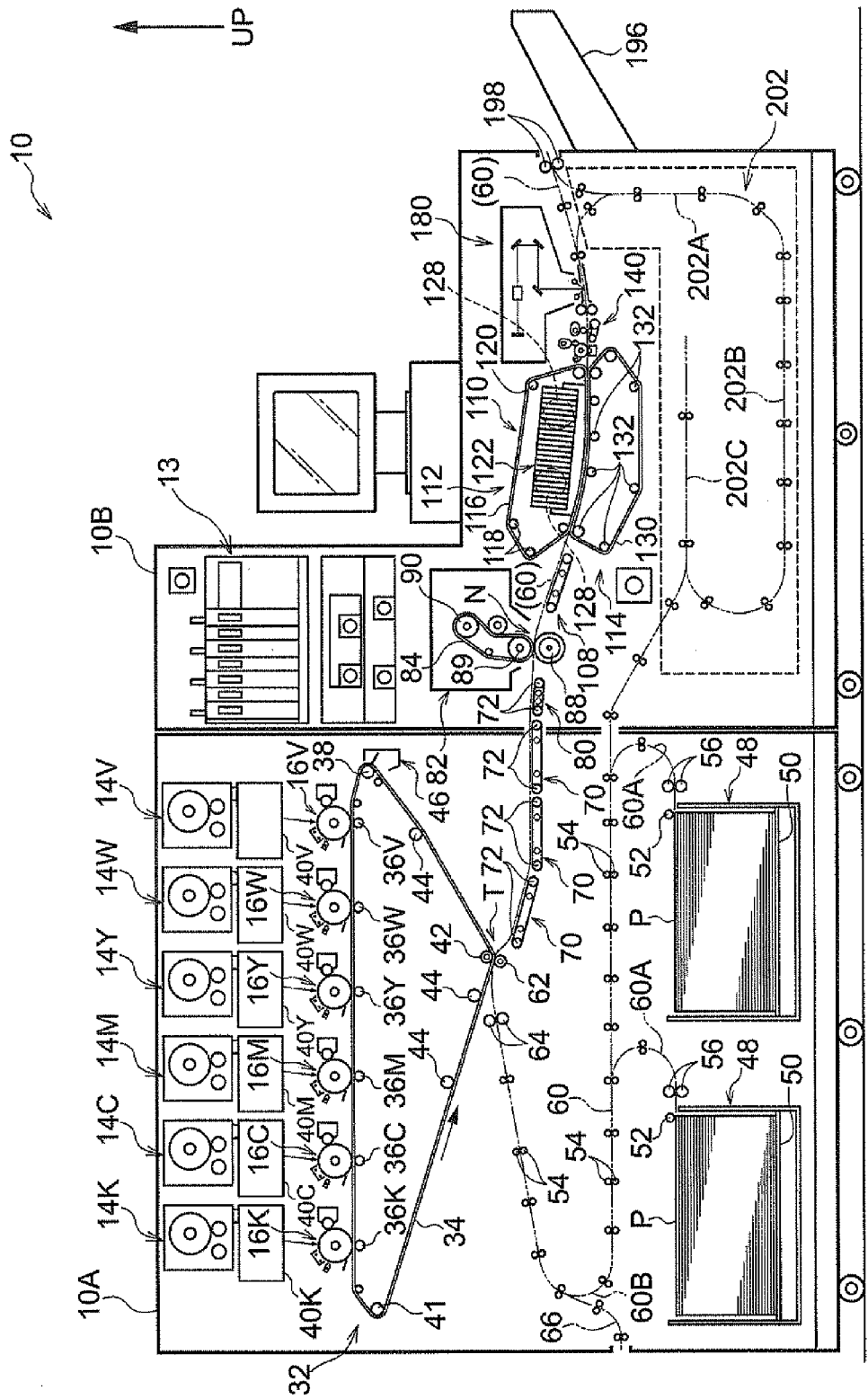
FIG. 10 is a schematic structural drawing showing the image forming device relating to the exemplary embodiment of the present invention.

An image forming device 10 relating to the present exemplary embodiment forms full-color images or black-and-white images. As shown in FIG. 10, the image forming device 10 has a first housing 10A in which is accommodated a first processing section that structures one side portion in the horizontal direction (the left side portion in FIG. 10), and a second housing 10B in which is accommodated a second processing section that structures the other side portion in the horizontal direction (the right side portion in FIG. 10).

An image signal processing section 13, that carries out image processings on image data that is sent-in from external devices such as computers or the like, is provided at the upper portion of the second housing 10B.

On the other hand, toner cartridges 14V, 14W, 14Y, 14M, 14C, 14K, that accommodate respective toners of a first special color (V), a second special color (W), yellow (Y), magenta (M), cyan (C), black (K), are replaceably provided at the upper portion of the first processing section 10A along the horizontal direction.

Note that the first special color and the second special color are appropriately selected from colors (including transparent) other than yellow, magenta, cyan and black. Further, in the following description, when differentiating among the first special color (V), the second special color (W), yellow (Y), magenta (M), cyan (C) and black (K) for the respective structural parts, the corresponding letter V, W, Y, M, C, K is appended to the reference numeral. If not differentiating among the first special color (V), the second special color (W), yellow (Y), magenta (M), cyan (C) and black (K) the letter V, W, Y, M, C, K, is omitted.

Six image forming units 16 corresponding to the toners of the respective colors are provided along the horizontal direction beneath the toner cartridges 14, so as to correspond to the respective toner cartridges 14.

Figure 9:
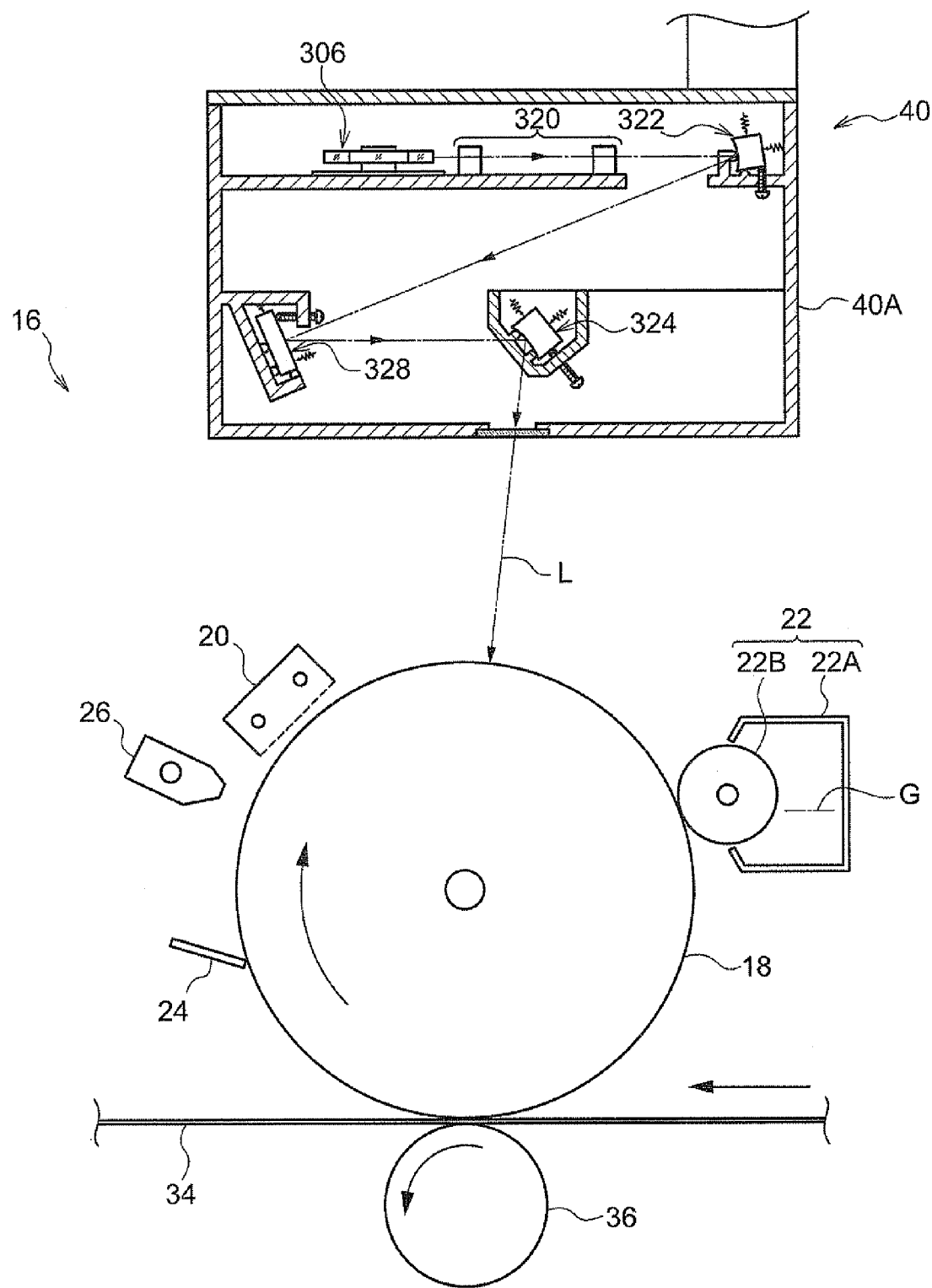
FIG. 9 is a schematic structural drawing showing an image forming unit that is employed in an image forming device relating to the exemplary embodiment of the present invention.

An optical scanner 40, that is provided for each of the image forming units 16, is structured so as to receive, from the aforementioned image signal processing section 13, image data that has been subjected to image processings by the image signal processing section 13, and illuminate light (laser) beams L, that are modulated in accordance with this image data, onto an image carrier 18 that is described hereafter (refer to FIG. 9).

As shown in FIG. 9, each of the image forming units 16 has the image carrier 18 that is driven and rotated in one direction (clockwise in FIG. 9). Due to the light beams L being illuminated from the optical scanner 40 onto the image carrier 18, an electrostatic latent image is formed on the image carrier 18. Details of the optical scanner 40 are described later.

Provided at the periphery of the image carrier 18 are: a corona discharge type (non-contact charging type) scorotron charger 20 that serves as an example of a charging device that charges the image carrier 18; a developing device 22 that develops, by a developer, the electrostatic latent image that is formed on the image carrier 18 by the optical scanner 40; a blade 24 serving as a removing member that removes the developer remaining on the image carrier 18 after transfer; and an erasing device 26 that carries out erasing charge by illuminating light onto the image carrier 18 after transfer.

The scorotron charger 20, the developing device 22, the blade 24 and the erasing device 26 are disposed so as to face the surface of the image carrier 18, in that order from the rotating direction upstream side toward the downstream side of the image carrier 18.

The developing device 22 is structured to include a developer accommodating member 22A that accommodates a developer G containing toner, and a developing roller 22B that supplies, to the image carrier 18, the developer G that is accommodated in the developer accommodating member 22A. The developer accommodating member 22A is connected to the toner cartridge 14 (see FIG. 10) through a toner supply path (not shown), and toner is supplied from the toner cartridge 14.

As shown in FIG. 10, a transfer section 32 is provided beneath the respective image forming units 16. The transfer section 32 is structured to include an intermediate transfer belt 34 that is annular and contacts the respective image carriers 18, and first transfer rollers 36 serving as first transfer members that transfer, in a superposed manner and onto the intermediate transfer belt 34, the toner images that are formed on the respective image carriers 18.

The intermediate transfer belt 34 is trained around a driving roller 38 that is driven by an unillustrated motor, a tension imparting roller 41 that imparts tension to the intermediate transfer belt 34, an opposing roller 42 that is disposed so as to oppose a second transfer roller 62 that will be described later, and plural training rollers 44. The intermediate transfer belt 34 is circulated in one direction (counterclockwise in FIG. 10) by the driving roller 38.

The respective first transfer rollers 36 are disposed so as to oppose the image carriers 18 of the respective image forming units 16, with the intermediate transfer belt 34 nipped therebetween. A transfer bias voltage, that is the opposite polarity of the toner polarity, is applied to the first transfer rollers 36 by an electricity supplying unit (not shown). Due to this structure, the toner images formed on the image carriers 18 are transferred onto the intermediate transfer belt 34.

A removing device 46, that causes a blade to contact the intermediate transfer belt 34 and removes residual toner, paper dust, and the like that are on the intermediate transfer belt 34, is provided at the opposite side of the driving roller 38 with the intermediate transfer belt 34 sandwiched therebetween.

Two recording media accommodating sections 48, in which recording media such as sheets or the like are accommodated, are provided along the horizontal direction beneath the transfer section 32.

Each of the recording media accommodating sections 48 can be pulled-out freely from the first housing 10A. A feed-out roller 52, that feeds a recording medium P out from the recording media accommodating section 48 to a transport path 60, is provided above one end side (the right side in FIG. 10) of each of the recording media accommodating sections 48.

A bottom plate 50 on which the recording media P are placed is provided within each of the recording media accommodating sections 48. When the recording media accommodating section 48 is pulled-out from the first housing 10A, the bottom plate 50 is lowered due to the instruction of an unillustrated control section. Due to the bottom plate 50 being lowered, a space into which a user can replenish the recording media P is formed in the recording media accommodating section 48.

When the recording media accommodating section 48 that has been pulled-out from the first housing 10A is set in (putted into) the first housing 10A, the bottom plate 50 rises up due to the instruction of the control section. Due to the bottom plate 50 rising up, the uppermost recording medium P that is set on the bottom plate 50 and the feed-out roller 52 contact one another.

Separating rollers 56, that separate one-by-one the recording media P that are fed-out from the recording media accommodating section 48 in a state of being superposed one another, are provided at the recording medium transporting direction downstream side (hereinafter simply called "downstream side" upon occasion) of the feed-out roller 52. Plural transporting rollers 54, that transport the recording medium P to the transporting direction downstream side, are provided at the downstream side of the separating rollers 56.

The transporting path 60, that is provided between the recording media accommodating sections 48 and the transfer section 32, extends to a transfer position T between the second transfer roller 62 and the opposing roller 42, so as to turn the recording medium P, that is fed-out from the recording media accommodating section 48, back toward the left side in FIG. 10 at a first turn-back section 60A, and further, turn the recording medium P back toward the right side in FIG. 10 at a second turn-back section 60B.

A transfer bias voltage of the opposite polarity as the toner polarity is applied by an electricity supplying unit (not shown) to the secondary transfer roller 62. Due to this structure, the toner image of the respective colors that have been multi-transferred onto the intermediate transfer belt 34 so as to be superposed one on another, are second transferred, by the second transfer roller 62, onto the recording medium P that is transported-in along the transporting path 60.

A spare path 66 that extends from the side surface of the first housing 10A is provided so as to merge into the second turn-back portion 60B of the transport path 60. The recording medium P, that is fed-out from another recording media accommodating section (not shown) that is disposed adjacent to the first housing 10A, is fed-into the transporting path 60 through this spare path 66.

Plural transporting belts 70, that transport the recording medium P on which the toner image has been transferred toward the second housing 10B, are provided in the first housing 10A at the downstream side of the transfer position T. A transporting belt 80, that transports downstream the recording medium P that has been transported by the transporting belts 70, is provided in the second housing 10B.

Each of the plural transporting belts 70 and the transporting belt 80 is formed in an annular shape and is trained around a pair of training rollers 72. The pair of training rollers 72 are disposed at the recording medium P transporting direction upstream side and downstream side, respectively. Due to one of the training rollers 72 being driven to rotate, the transporting belt 70 (the transporting belt 80) is circulated in one direction (clockwise in FIG. 10).

A fixing unit 82 that fixes the toner image, that has been transferred onto the surface of the recording medium P, on the recording medium P by heat and pressure, is provided at the downstream side of the transporting belt 80.

The fixing unit 82 has a fixing belt 84 and a pressure-applying roller 88 that is disposed so as to contact the fixing belt 84 from the lower side thereof. A fixing portion N, at which pressure is applied to the recording medium P and the recording medium P is heated such that the toner image is fixed thereon, is formed between the fixing belt 84 and the pressure-applying roller 88.

The fixing belt 84 is formed in an annular shape, and is trained around a driving roller 89 and a driven roller 90. The driving roller 89 opposes the pressure-applying roller 88 from the upper side thereof, and the driven roller 90 is disposed even further toward the upper side than the driving roller 89.

A heating portion, such as a halogen heater or the like, is incorporated in each of the driving roller 89 and the driven roller 90. The fixing belt 84 is heated thereby.

As shown in FIG. 10, a transporting belt 108, that transports downstream the recording medium P that is fed-out from the fixing unit 82, is provided at the downstream side of the fixing unit 82. The transporting belt 108 is formed similarly to the transporting belt 70.

A cooling unit 110, that cools the recording medium P that has been heated by the fixing unit 82, is provided at the downstream side of the transporting belt 108.

The cooling unit 110 has an absorbing device 112 that absorbs the heat of the recording medium P, and a pushing device 114 that pushes the recording medium P against the absorbing device 112. The absorbing device 112 is disposed at one side of the transporting path 60 (the upper side in FIG. 10), and the pushing device 114 is disposed at the other side (the lower side in FIG. 10).

The absorbing device 112 has an absorbing belt 116 that is annular and contacts the recording medium P and absorbs the heat of the recording medium P. The absorbing belt 116 is trained around a driving roller 120 that transmits driving force to the absorbing belt 116, and plural training rollers 118.

A heat sink 122, that is formed of an aluminum material and planarly contacts the absorbing belt 116 and dissipates the heat that the absorbing belt 116 has absorbed, is provided at the inner peripheral side of the absorbing belt 116.

Fans 128, for taking heat from the heat sink 122 and exhausting hot air to the exterior, are disposed at the reverse side of the second housing 10B (the far side in the depthwise direction of FIG. 10).

The pushing device 114, that pushes the recording medium P against the absorbing device 112, has a pushing belt 130 that is annular and transports the recording medium P while pushing the recording medium P against the absorbing belt 116. The pushing belt 130 is trained around plural training rollers 132.

A correcting device 140, that nips and transports the recording medium P and corrects the curving (curling) of the recording medium P, is provided at the downstream side of the cooling unit 110.

A detecting device 180, that detects toner density defects, image defects, image position defects and the like of the toner image that is fixed on the recording medium P, is provided at the downstream side of the correcting device 140.

At the detecting device 180, toner density defects, image defects, image position defects, and the like are detected by reflected light, that is illuminated onto the recording medium P from a light source and is reflected upward by the recording medium P, being detected by a detecting element such as a CCD (Charge Coupled Device) image sensor or the like.

Discharging rollers 198, that discharge the recording medium P, on whose one side an image has been formed, out to a discharging section 196 that is mounted to the side surface of the second housing 10B, are provided downstream of the detecting device 180.

On the other hand, when images are to be formed on both surfaces, the recording medium P that is sent-out from the detecting device 180 is transported to an inversion path 202 that is provided at the downstream side of the detecting device 180.

Provided at the inversion path 202 are: a forked-off path 202A that is forked-off from the transporting path 60; a sheet transporting path 202B, that transports, toward the first housing 10A, the recording medium P that is transported along the forked-off path 202A; and an inverting path 202C that turns the recording medium P, that is transported along the sheet transporting path 202B, back in the opposite direction so as to switchback-transport the recording medium P and invert the obverse and reverse thereof.

Due to this structure, the recording medium P that has been switchback-transported at the inverting path 202C is transported toward the first housing 10A, and further, is fed into the transporting path 60 provided above the recording media accommodating sections 48 and is again fed to the transfer position T.

The image forming processes of the image forming device 10 are described next.

The image data, that has been subjected to image processings at the image signal processing section 13, is sent to the respective optical scanners 40. At the optical scanners 40, the respective light beams L are emitted in accordance with the image data and expose the respective image carriers 18 that have been charged by the scorotron chargers 20, such that electrostatic latent images are formed.

As shown in FIG. 9, the electrostatic latent images that are formed on the image carriers 18 are developed by the developing devices 22, and toner images of the respective colors of the first special color (V), the second special color (W), yellow (Y), magenta (M), cyan (C) and black (K) are formed.

As shown in FIG. 10, the toner images of the respective colors, that are formed on image carriers 18 of the respective image forming units 16V, 16W, 16Y, 16M, 16C, 16K, are successively transferred in a superposed manner onto the intermediate transfer belt 34 by the six first transfer rollers 36V, 36W, 36Y, 36M, 36C, 36K.

The toner images of the respective colors, that have been transferred onto the intermediate transfer belt 34 so as to be superposed one on another, are second-transferred, by the second transfer roller 62, onto the recording medium P that is transported-in from the recording media accommodating section 48. The recording medium P, on which the toner image have been transferred, is transported by the transporting belts 70 toward the fixing unit 82 that is provided within the second housing 10B.

The toner images of the respective colors on the recording medium P are fixed to the recording medium P by heat and pressure being applied thereto by the fixing unit 82. Further, the recording medium P on which the toner images have been fixed passes through the cooling unit 110 and is cooled, and thereafter, is sent into the correcting device 140 such that curvature that has arisen at the recording medium P is corrected.

Image defects and the like of the recording medium P, whose curving has been corrected, are detected by the detecting device 180. Thereafter, the recording medium P is discharged-out to the discharging section 196 by the discharging rollers 198.

On the other hand, if an image is to be formed on the non-image surface at which an image has not been formed (i.e., if double-sided printing is to be carried out), after passing through the detecting device 180, the recording medium P is inverted at the inversion path 202, and is fed-into the transporting path 60 provided above the recording media accommodating sections 48. Toner images are formed on the reverse surface of the recording medium P by the processes described above.

Note that, in the image forming device 10 relating to the present exemplary embodiment, the parts for forming the images of the first special color and the second special color (the image forming units 16V, 16W, the optical scanners 40V, 40W, the toner cartridges 14V, 14W, the first transfer rollers 36V, 36W) are structured so as to be able to be installed in the first housing 10A as additional parts in accordance with the selection of the user. Accordingly, the image forming device 10 may be structured so as to not have parts for forming images of the first special color and the second special color, or may be structured so as have only parts for forming the image of one color among the first special color and the second special color.

(Structure of Main Portions)

The structure of the optical scanner 40 is described next.

Figure 4:
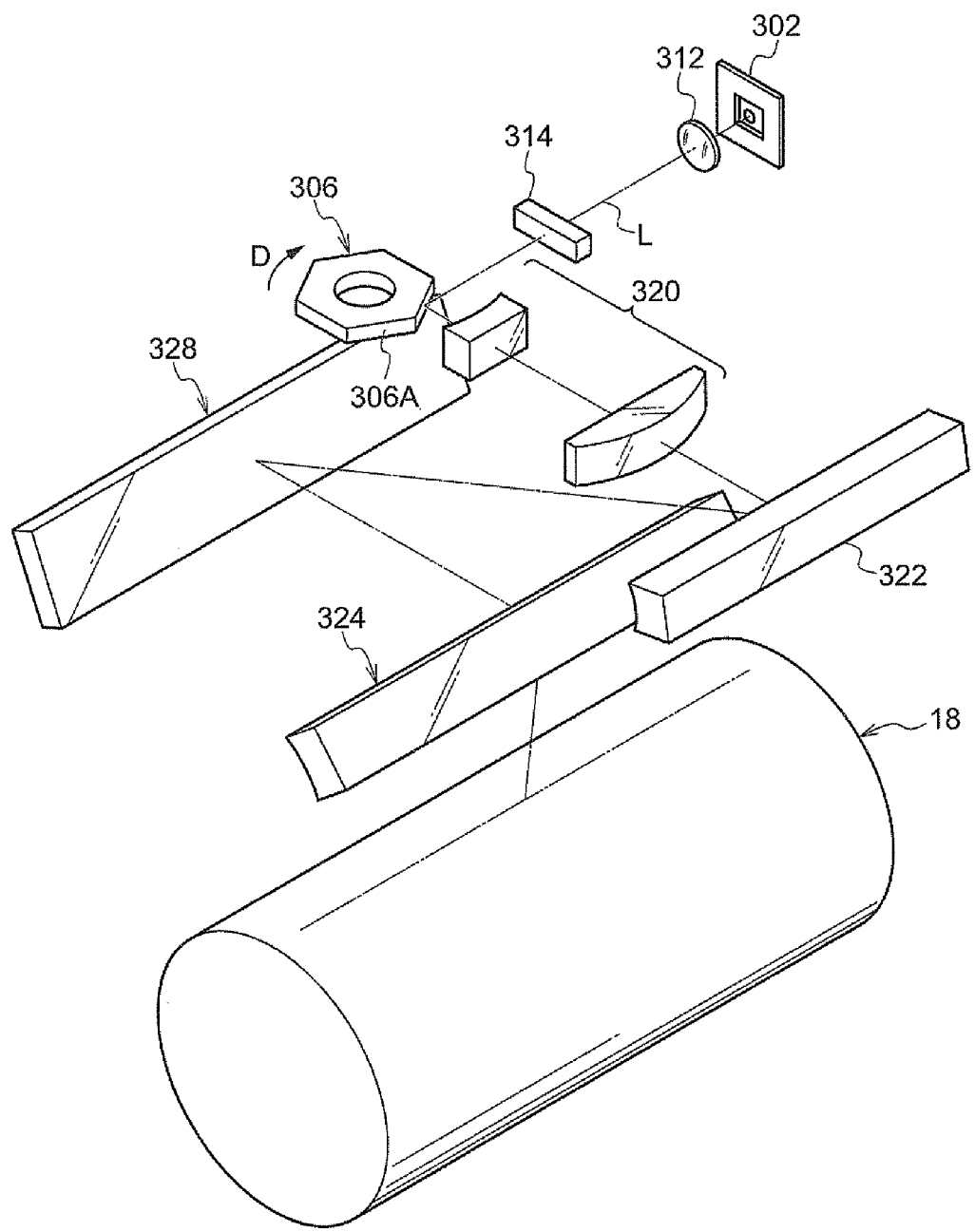
FIG. 4 is a perspective view showing the optical structure of the optical scanner relating to the exemplary embodiment of the present invention.

As shown in FIG. 4, the optical scanner 40 has a laser device 302 that is fixed to a housing 40A (see FIG. 2) of the optical scanner 40 and that serves as an example of a light source that emits the plural light (laser) beams L. Further, a polygon mirror 306, that is a rotating polygon mirror serving as an example of a deflecting section that deflects the light beam L that has exited from the laser device 302, is provided between the laser device 302 and the image carrier 18 onto which the light beams L emitting from the laser device 302 are illuminated.

Figure 5A:
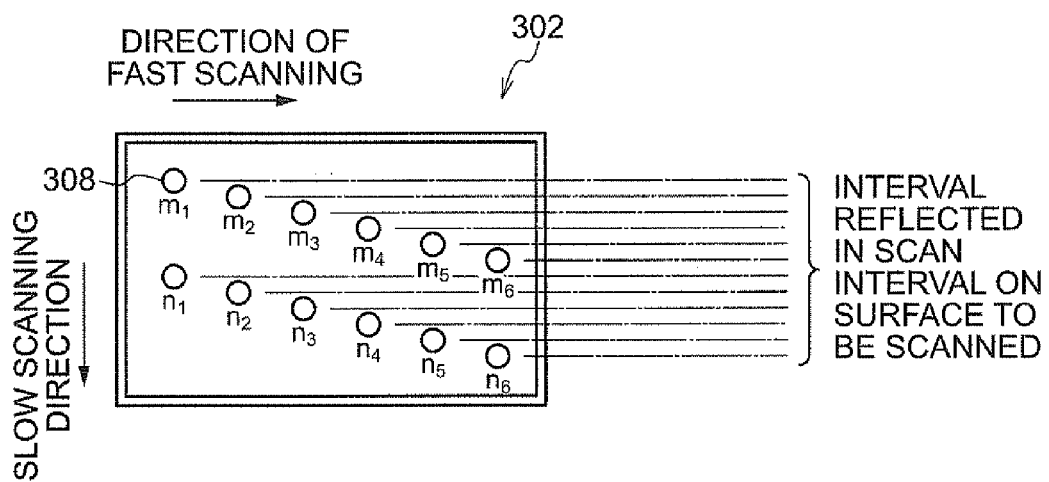
FIG. 5A is a front view showing a laser device that is employed in an optical device relating to the exemplary embodiment of the present invention.
Figure 5B:
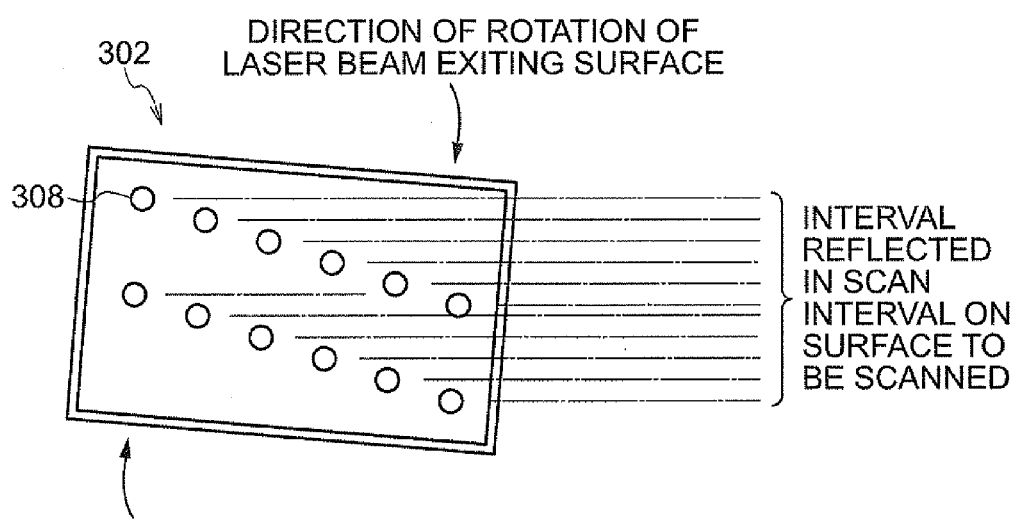
FIG. 5B is a front view showing the laser device that is employed in the optical device relating to the exemplary embodiment of the present invention.

As shown in FIG. 5A, the laser device 302 is a surface emitting laser in which light (laser)-emitting points 308, from which the light beams L exit, are arrayed two-dimensionally, and emits the plural light beams L. Specifically, at the laser device 302, the light-emitting points 308 are disposed two-dimensionally. Six of the light-emitting points 308 are arrayed at a predetermined interval on a straight line that is at a predetermined angle with respect to the direction in which the exiting light beams L are fast-scanned and the direction in which they are slow scanned. Two of these rows of the light-emitting points 308 are formed.

Further, the light beams L that are respectively modulated emit from the respective light-emitting points 308, and the light beams L that have emitted scan scan-lines that differ in the slow scanning direction.

As shown in FIG. 58, the positions of the light-emitting points 308 can be adjusted by rotating the laser device 302 parallel to the plane of emitting of the light beams L. Due thereto, the interval, in the slow scanning direction, of the light beams L can be adjusted.

Figure 2:
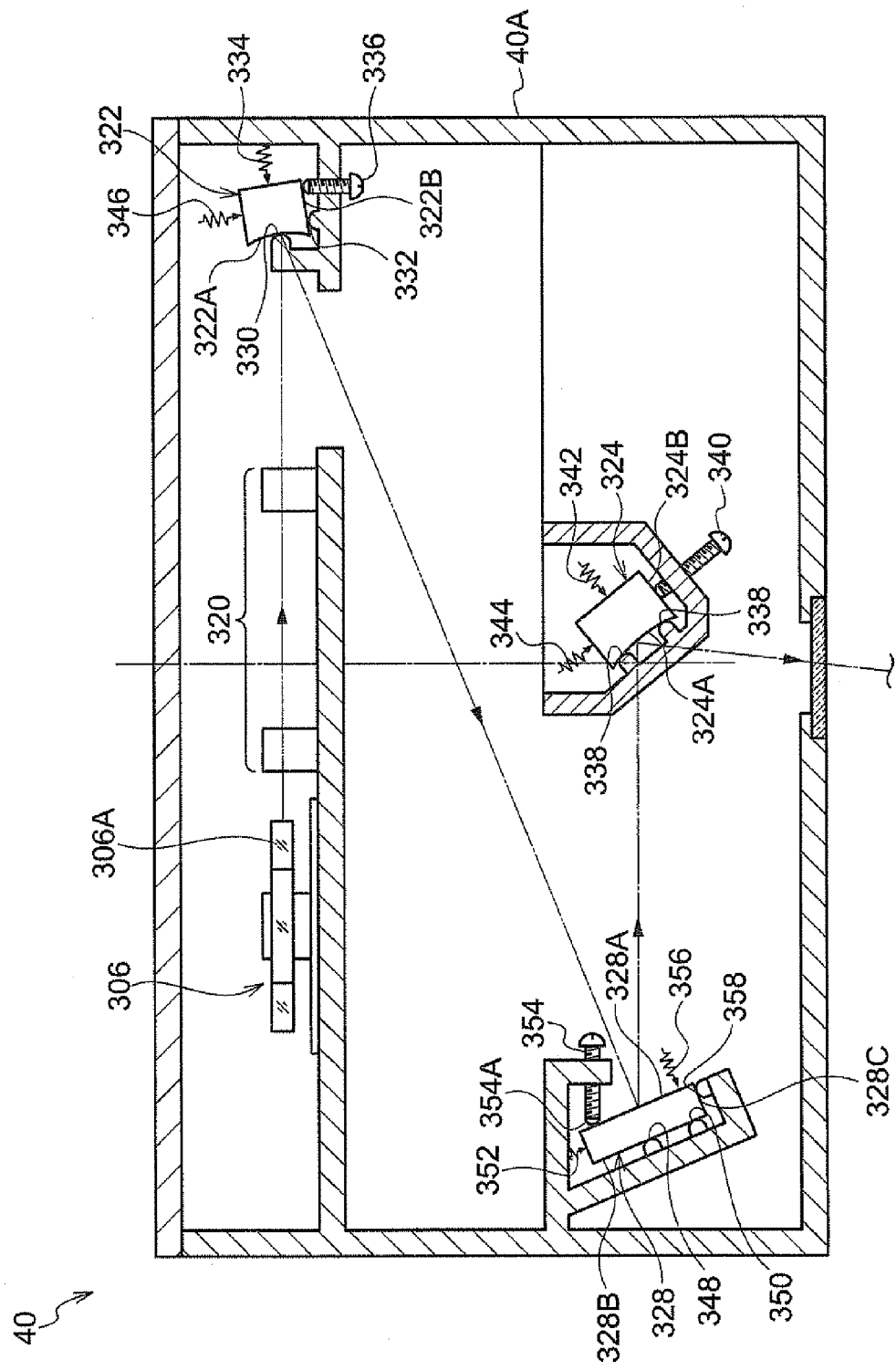
FIG. 2 is a schematic structural drawing showing the optical scanner relating to the exemplary embodiment of the present invention.

Further, as shown in FIG. 2 and FIG. 4, at the polygon mirror 306, six reflecting surfaces 306A are provided at the side surfaces of a rotating body that is a regular polygonal column (a regular hexagonal column in the present exemplary embodiment). The polygon mirror 306 rotates in the direction of arrow D by the driving force of an unillustrated motor, with the central axis of the regular hexagon being the center of rotation.

The plural light beams L that are emitted from the laser device 302 are simultaneously incident on the same reflecting surface 306A. Then, due to the polygon mirror 306 rotating, the angle of incidence of the light beams L with respect to the respective reflecting surfaces 306A varies continuously, and the light beams L that are reflected at the reflecting surface 306A are deflected. The plural light beams L thereby simultaneously scan, in the fast scanning direction, the surface to be scanned of the image carrier 18.

On the other hand, a collimator lens 312 and a cylindrical lens 314 are provided in that order on the optical path between the laser device 302 and the polygon mirror 306, at the light beam L optical path downstream side (hereinafter simply called optical path downstream side) of the laser device 302. The plural light beams L that emitting from the respective light-emitting points 308 are converted by the collimator lens 312 from divergent light into parallel light. The light beams L are converged in the slow scanning direction and are led to the polygon mirror 306 by the cylindrical lens 314.

Namely, the plural light beams L that are emitted from the laser device 302 pass through the collimator lens 312 so become parallel light, and are so as to intersect at focal point position F at the optical path downstream side of the collimator lens 312 (see FIG. 3) so become convergent.

Further, as shown in FIG. 4, an fθ lens 320, a first cylindrical mirror 322, and a second cylindrical mirror 324 are provided on the optical path between the reflecting surface 306A of the polygon mirror 306 and the surface to be scanned on the image carrier 18, at the optical path downstream side of the polygon mirror 306. The fθ lens 320 has power to collect (condense) light only in the fast scanning direction, and makes the speed of the light beams L that are fast scanned on the surface to be scanned be a uniform speed. The first cylindrical mirror 322 serves as an example of a first optical element, and the second cylindrical mirror 324 serves as an example of a second optical element. The first cylindrical mirror 322 and the second cylindrical mirror 324 have power to converge the light beams L in the slow scanning direction.

A reflecting mirror 328, that serves as an example of a reflecting member that adjusts the angle in the slow scanning direction of the light beams L that are incident on the second cylindrical mirror 324, is provided on the optical path between the first cylindrical mirror 322 and the second cylindrical mirror 324.

Specifically, the fθ lens 320 adjusts the light beams L such that the scanning speed becomes equal (uniform) when the light beams L, that are deflected at the polygon mirror 306, are scanned on the surface to be scanned of the image carrier 18.

The first cylindrical mirror 322 and the second cylindrical mirror 324 have power to collect (condense) light mainly in the slow scanning direction, and lead the respective light beams L to the image carrier 18, and image the respective light beams L on the surface to be scanned of the image carrier 18.

Further, the first cylindrical mirror 322 and the second cylindrical mirror 324 are disposed such that the image side focal point position of the first cylindrical mirror 322 and the object side focal point position of the second cylindrical mirror 324 coincide (such that the optical path length between the first cylindrical mirror 322 and the second cylindrical mirror 324 is the sum of the focal length of the first cylindrical mirror 322 and the focal length of the second cylindrical mirror 324). Due thereto, the reflecting surface 306A of the polygon mirror 306 and the scanning position of the peripheral surface of the image carrier 18 are in a conjugate relationship and are a focal in the slow scanning direction.

The holding structure of the first cylindrical mirror 322 is described next. As shown in FIG. 2, a supporting portion 330, that is convex and supports the incident position (the generatrix position) of the light beams L at a reflecting surface 322A of the first cylindrical mirror 322, and a supporting portion 332, that is convex and supports a bottom surface 322B of the first cylindrical mirror 322, are provided at both sides in the longitudinal direction of the first cylindrical mirror 322 that extends along the fast scanning direction.

An urging member 334 that urges the first cylindrical mirror 322 toward the supporting portions 330, and an urging member 346 that urges the first cylindrical mirror 322 toward the supporting portions 332, are further provided. Also, an adjusting screw 336, whose distal end portion abuts the bottom surface 322B of the first cylindrical mirror 322 and that rotates the first cylindrical mirror 322 around the generatrix position by being advanced or withdrawn, is provided.

Due to this structure, the first cylindrical mirror 322 is held at the housing 40A. Due to the adjusting screw 336 being advanced or withdrawn by being rotated, the first cylindrical mirror 322 rotates around the generatrix position, and positions in the slow scanning direction of the light beams L are adjusted.

The holding structure of the second cylindrical mirror 324 is described next. As shown in FIG. 2, a pair of supporting portions 338, that support the slow scanning direction both sides of a reflecting surface 324A of the second cylindrical mirror 324, and adjusting screws 340, whose distal end portions abut a bottom surface 324B of the second cylindrical mirror 324 and that, by being advanced or withdrawn, move the second cylindrical mirror 324 along the reflecting surface 324A, are provided at both sides in the longitudinal direction of the second cylindrical mirror 324 that extends in the fast scanning direction.

An urging member 342, that urges the second cylindrical mirror 324 toward the supporting portions 338, and an urging member 344, that urges the second cylindrical mirror 324 toward the adjusting screws 340, are further provided.

Due to this structure, the second cylindrical mirror 324 is held at the housing 40A. Due to the adjusting screws 340, that are provided at the both sides, being advanced or withdrawn by being rotated respectively, the second cylindrical mirror 324 moves along the reflecting surface 324A, so the tilting (skewing) of the scan lines of the light beams L is adjusted.

On the other hand, as shown in FIG. 1A, FIG. 1B and FIG. 2, the reflecting mirror 328, that is disposed on the optical path between the first cylindrical mirror 322 and the second cylindrical mirror 324, is shaped as a flat plate, and is shaped as a rectangle that extends along the fast scanning direction. A first protruding portion 348 serving as an example of a first contact portion that contacts a reverse surface 328B at the opposite side of a reflecting surface 328A of the reflecting mirror 328, and a second protruding portion 350 serving as an example of a second contact portion that contacts the reverse surface 328B, and a pair of protruding portions 358 that support the both end sides of a bottom surface 328C of the reflecting mirror 328, are provided.

The first protruding portion 348 and the second protruding portion 350, and an adjusting screw 354 and an urging member 356 which are mentioned later structures an adjusting mechanism 326.

Further, an adjusting screw 354 that serves as an example of a third contacting portion is provided whose distal end portion 354A contacts the reflecting surface 328A of the reflecting mirror 328. By being advanced or withdrawn, the adjusting screw 354 rotates the reflecting mirror 328 around a straight line that connects the point supported by the first protruding portion 348 and the point supported by the second protruding portion 350.

Also provided are an urging member 356, that urges the reflecting mirror 328 toward the first protruding portion 348, the second protruding portion 350 and the distal end portion 354A of the adjusting screw 354, and an urging member 352 that urges the reflecting mirror 328 toward the protruding portions 358.

Specifically, as shown in FIG. 1B, the first protruding portion 348 is provided at one end side in the longitudinal direction of the reflecting mirror 328 (in the vicinity of the one end portion of the reflecting mirror 328), on a central line C that extends in the fast scanning direction of the reflecting mirror 328. The second protruding portion 350 is provided at the other end side in the longitudinal direction of the reflecting mirror 328 (in the vicinity of the other end portion of the reflecting mirror 328), and is provided at one side further than the central line C (the lower side in the present exemplary embodiment), that is, at a position which is away from the central line C with a predetermined distance in a width direction of the reflecting mirror 328 (in the slow scan direction). The distal end portion 354A of the adjusting screw 354 is provided at the other side further than the central line C (the upper side in the present exemplary embodiment) at a position that is symmetrical to the second protruding portion 350 across the central line C. The triangle that is formed by connecting the first protruding portion 348, the second protruding portion 350 and the distal end portion 354A is an isosceles triangle whose vertex is the first protruding portion 348.

The position at which the urging member 356 urges the reflecting mirror 328 is on a diagonal line of the reflecting mirror 328 with respect to the distal end portion 354A with the central line C disposed therebetween (i.e., on a position of a point symmetry with respect to the distal end portion 354A with a center of gravity G of the reflecting mirror 328 being the reference).

Namely, the surface position of the reflecting surface 328A of the reflecting mirror 328 is determined by the first protruding portion 348, the second protruding portion 350 and the distal end portion 354A. The center of gravity G of the reflecting mirror 328 is within the triangle that is formed by connecting the first protruding portion 348, the second protruding portion 350 and the distal end portion 354A.

Further, by the adjusting screw 354 being advanced or withdrawn, the reflecting mirror 328 rotates around the straight line E (FIG. 1B) that connects the point that contacts the first protruding portion 348 and the point that contacts the second protruding portion 350. Due thereto, the angle when the plural light beams L are incident on the second cylindrical mirror 324 is adjusted. The actual focal length of the second cylindrical mirror 324 varies, and the interval (pitch) of the plural light beams L is adjusted.

Note that the center of rotation of the reflecting mirror 328 is inclined with respect to the fast scanning direction. Therefore, it can be thought that, by rotating the reflecting mirror 328, the light beams L tilt with respect to the fast scanning direction. In this case, the tilting is corrected by adjusting the tilting (skew) of the scan lines by rotating the second cylindrical mirror 324.

(Operation)

The operation of scanning the peripheral surface (surface to be scanned) of the image carrier 18 by the optical scanner 40 is described next.

Figure 3:
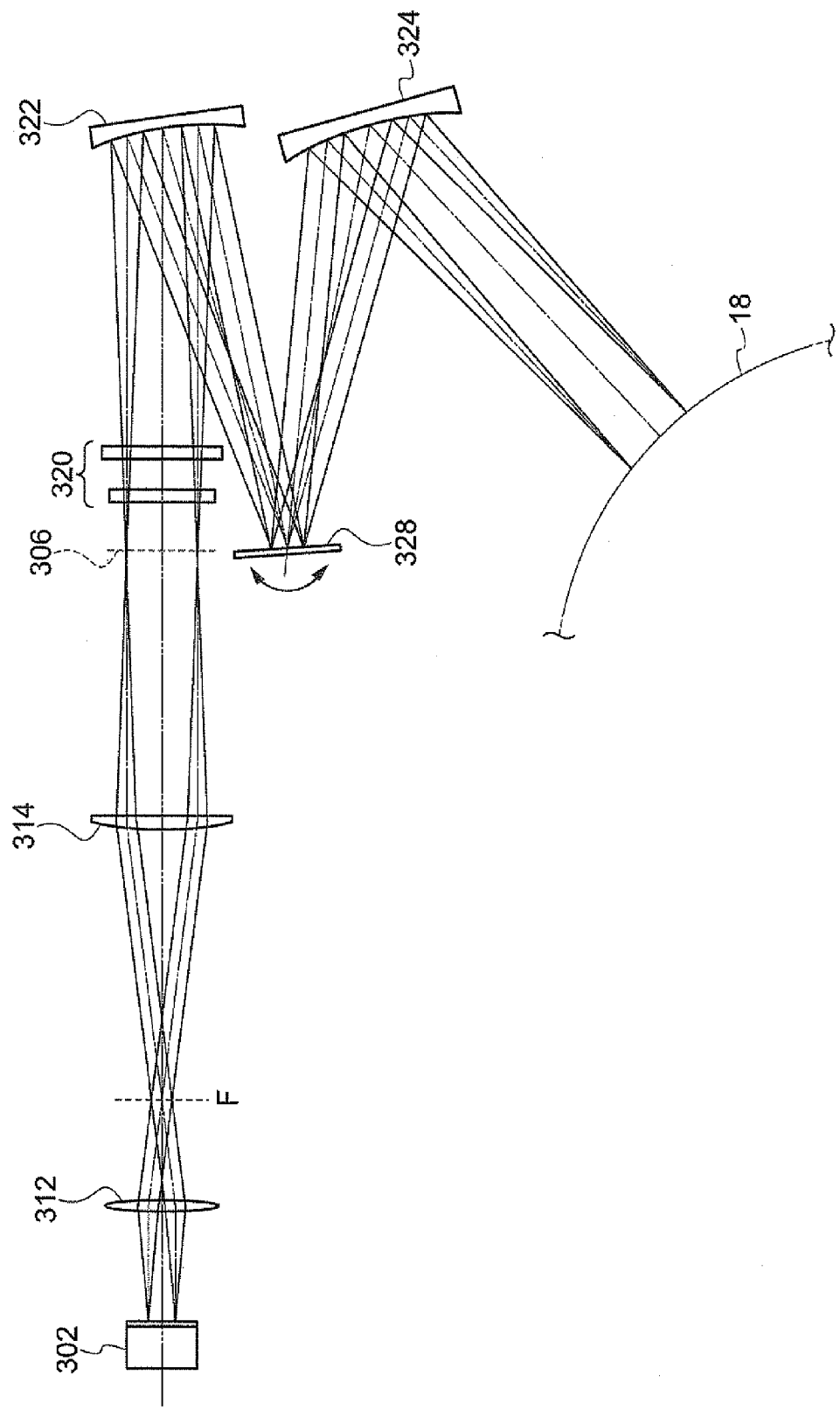
FIG. 3 is a schematic structural drawing showing the optical structure of the optical scanner relating to the exemplary embodiment of the present invention.

As shown in FIG. 3 and FIG. 4, the plural light beams L that are emitted from the laser device 302 are made into parallel light by the collimator lens 312, are converged in the slow scanning direction by the cylindrical lens 314, and are incident on the reflecting surface of the polygon mirror 306. Then, the plural light beams L that are incident on the reflecting surface 306A of the polygon mirror 306 are deflected by the rotation of the polygon mirror 306.

The plural light beams L, that are deflected by the rotation of the polygon mirror 306, are incident on the fθ lens 320, and the scanning speed at the time of fast scanning the light beams L on the surface to be scanned of the image carrier 18 is made to be a uniform speed.

Then, the plural light beams L are imaged on the surface to be scanned of the image carrier 18 by the first cylindrical mirror 322 and the second cylindrical mirror 324 that have power of collecting (condensing) light mainly in the slow scanning direction.

At this time, the angle at the time when the plural light beams L are incident on the second cylindrical mirror 324 is adjusted by rotating the reflecting mirror 328. Due thereto, the actual focal length of the second cylindrical mirror 324 varies, and the interval (pitch) of the plural light beams L is adjusted.

The principles of adjusting the interval (pitch) of the plural light beams L is described here.

Figure 6:
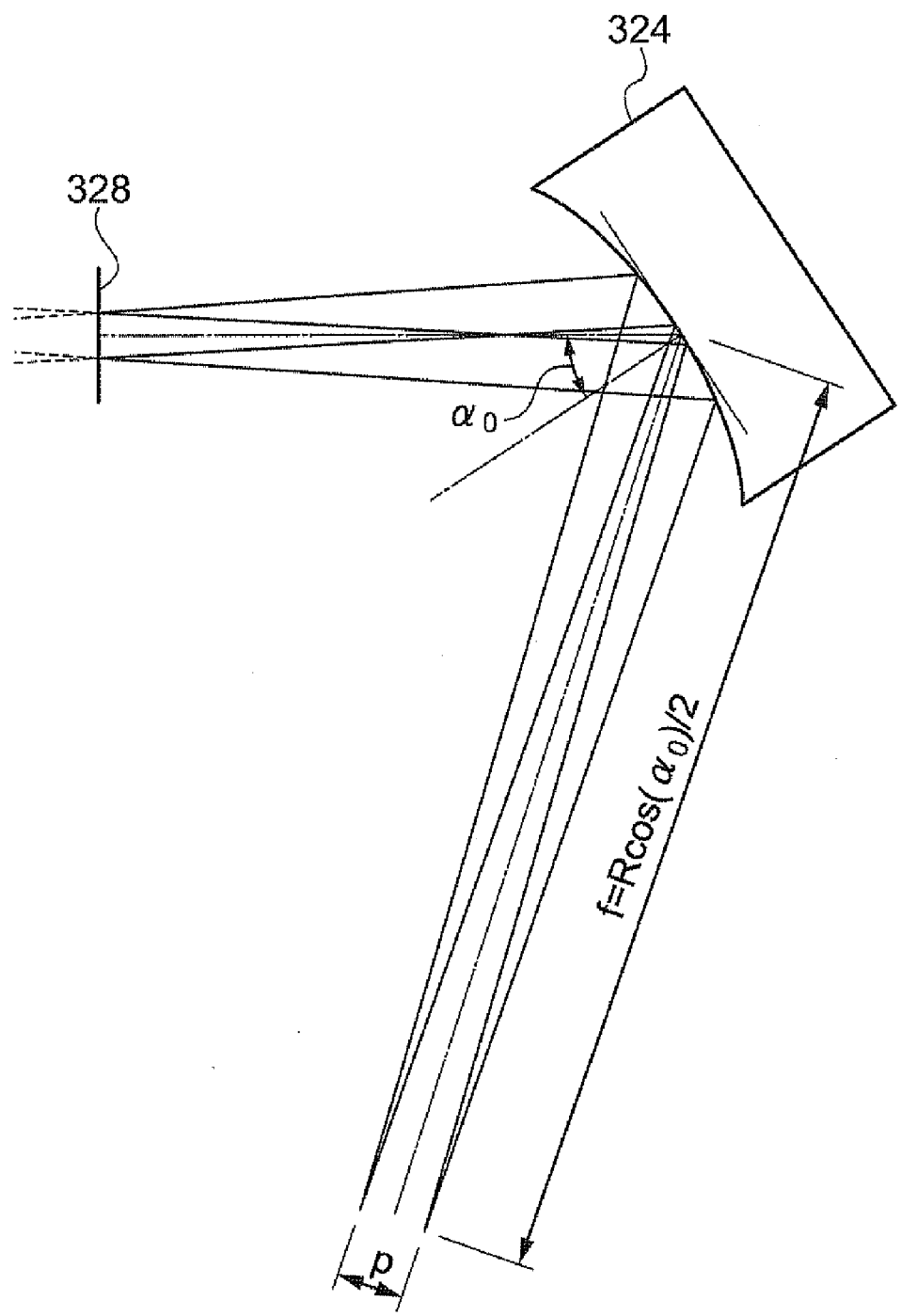
FIG. 6 is a side view showing a second cylindrical mirror that is employed in the optical scanner relating to the exemplary embodiment of the present invention.
Figure 7:
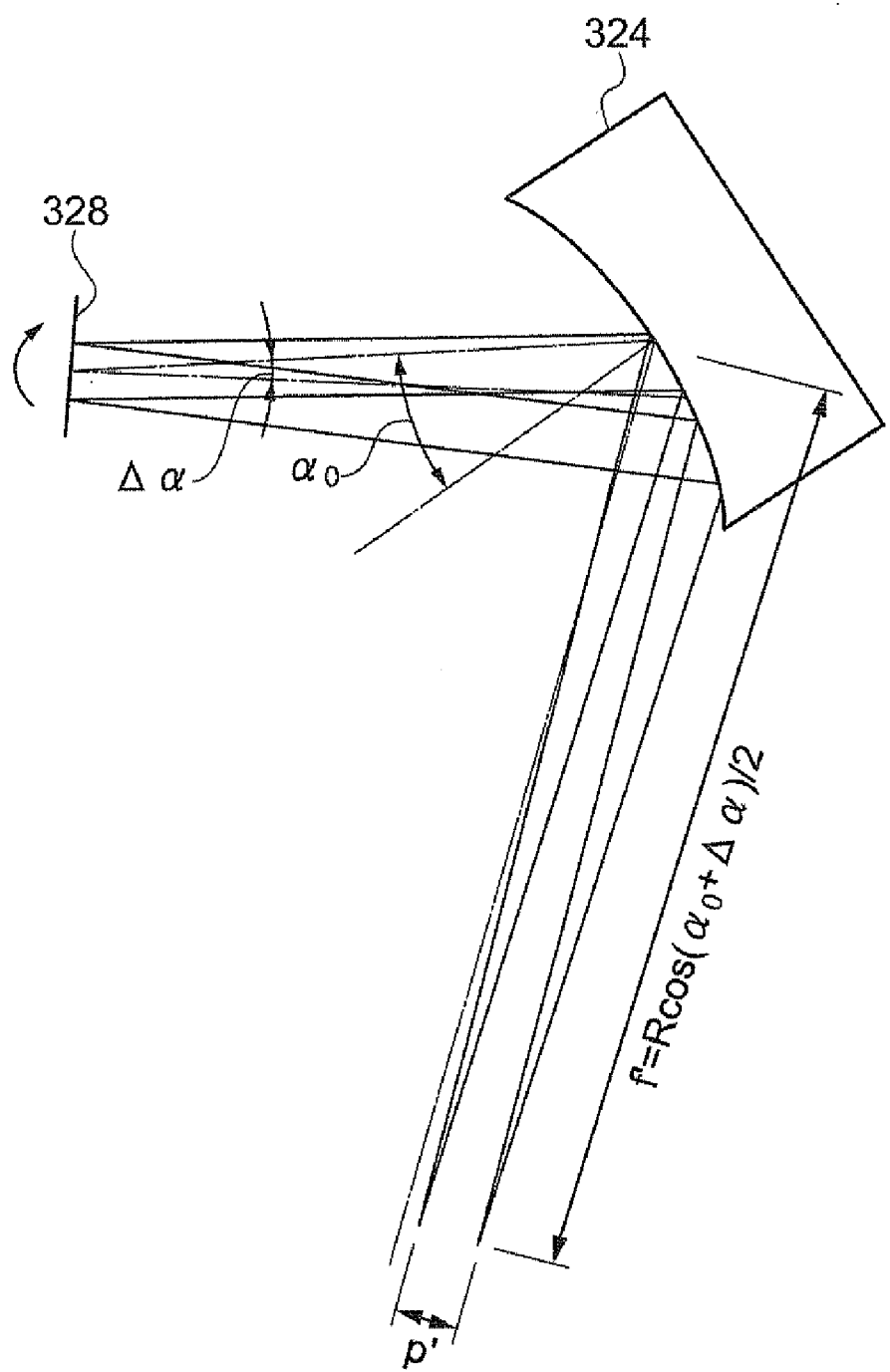
FIG. 7 is a side view showing the second cylindrical mirror that is employed in the optical scanner relating to the exemplary embodiment of the present invention.
Figure 8:
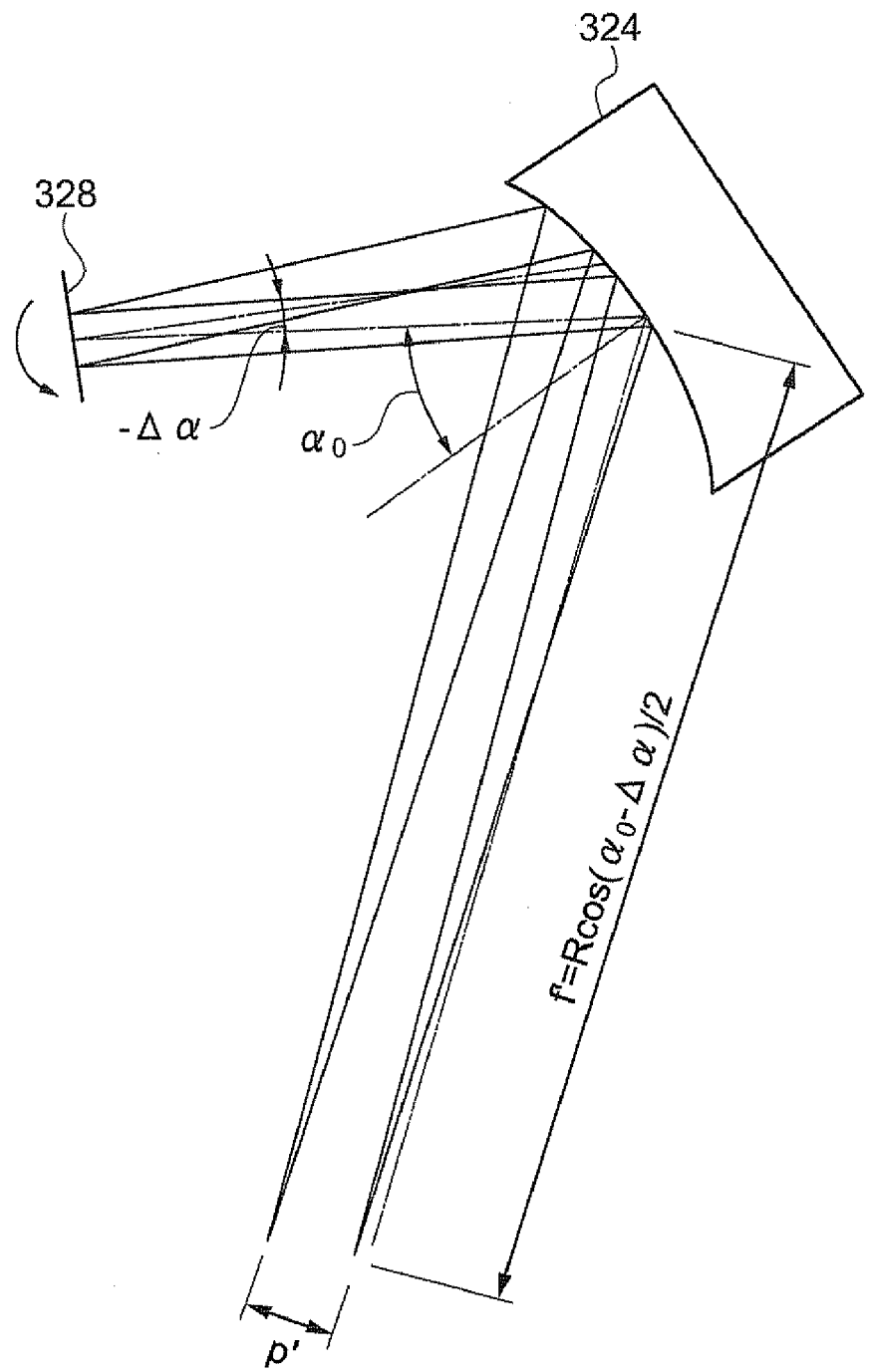
FIG. 8 is a side view showing the second cylindrical mirror that is employed in the optical scanner relating to the exemplary embodiment of the present invention.

As shown in FIG. 6, when the light ring of the plural light beams L is incident on the second cylindrical mirror 324 at angle $\alpha_0$, the angle of incidence can be made small as shown in FIG. 8 or the angle of incidence can be made large as shown in FIG. 7, by rotating the reflecting mirror 328. Given that the radius of curvature of the reflecting surface of the second cylindrical mirror 324 is R, focal length f is expressed by $$f = R \times \cos(\alpha_0)/2,$$

and, in accordance with change $\pm \Delta \alpha$ in the angle of incidence, focal length f' becomes $$f' = R \times \cos(\alpha_0 \pm \Delta \alpha)/2.$$

Accordingly, if the angle of incidence α becomes smaller, i.e., if $\Delta \alpha$ is negative, the actual focal length f' becomes greater than f, and a scanning interval P (pitch) in the slow scanning direction of the plural light beams L becomes large (P' becomes large).

On the other hand, if the angle of incidence α becomes larger, i.e., if $\Delta \alpha$ is positive, the effective focal length f' becomes smaller than f, and the scanning interval P in the slow scanning direction of the plural light beams L becomes small (P' becomes small). The scanning interval P (pitch) in the slow scanning direction of the plural light beams L is adjusted by adjusting the angle of incidence onto the second cylindrical mirror 324 in this way.

As described above, the pitch in the slow scanning direction of the plural light beams L on the scan surface is adjusted by adjusting the incidence position in the slow scanning direction of the plural light beams L onto the plane mirror 328 by the first cylindrical mirror 322, and adjusting the incidence position onto the second cylindrical mirror 324 by the plane mirror 328.

Even though the pitch is adjusted by carrying out adjustment around the optical path of the original design, changes in the conjugate point is small. Therefore, pitch irregularity in the slow scanning direction of the plural light beams L is suppressed.

The tilting adjustment (skew adjustment) of the central line of the curvature in the longitudinal direction (the generatrix in the case of a cylindrical mirror), that is carried out by using one side of the second cylindrical mirror 324 as a fulcrum, makes the incidence positions in the longitudinal direction of the second cylindrical mirror 324 be the same positions over the entire scanning width.

Further, the same light beam L interval can be established over the entire scanning width, pitch irregularity in the slow scanning direction is suppressed over the entire surface, and banding is prevented.

The reflecting mirror 328 is supported by being pushed at three points, in a state in which the center of gravity G of the reflecting mirror 328 is positioned within a triangle that is formed by connecting the first protruding portion 348, the second protruding portion 350 and the distal end portion 354A. Therefore, vibrating of the reflecting mirror 328 due to input from the exterior is suppressed.

Further, the first protruding portion 348 is provided on the central line C that extends in the fast scanning direction of the reflecting mirror 328. The triangle, that is formed by connecting the first protruding portion 348, the second protruding portion 350 and the distal end portion 354A, is an isosceles triangle whose vertex is the first protruding portion 348. Therefore, vibrating of reflecting mirror 328 due to input from the exterior is effectively suppressed.

Due to vibration of the reflecting mirror 328 being suppressed, the scanning interval (pitch) in the slow scanning direction of the plural light beams L is stable. In the case of adjacent exposure in which the writing positions by the light beams L are offset each time by the writing width, inferiority of the output image (e.g., irregularities in density such as banding or the like) is suppressed.

Further, as shown in FIG. 2, the adjusting screws 336, 340, 354 are adjusted by a worker who is at the same position, by making the tool insertion direction of the adjusting screw 336 of the first cylindrical mirror 322 be from the lower side, the tool insertion direction of the adjusting screws 340 of the second cylindrical mirror 324 be oblique from the bottom right in FIG. 2, and the tool insertion direction of the adjusting screw 354 of the reflecting mirror 328 be from the right side in FIG. 2. The produceability is improved by these adjusting screws 336, 340, 354 being adjusted by a worker who is at the same position.

Note that fast scanning direction and the slow scanning direction in the optical scanner 40 and the image forming device 10 relating to the present exemplary embodiment are generally set so as to be substantially orthogonal. However, cases in which the fast scanning direction and the slow scanning direction are different than orthogonal are also included.

What is claimed is:

1. An optical scanner comprising:
    a light source that emits a plurality of laser beams;
    a deflecting section that includes reflecting surfaces on each of which the plurality of laser beams emitted from the light source are incident, and that moves the reflecting surfaces to deflect the laser beams that are incident on the reflecting surface;
    a first optical element that reflects the plurality of laser beams deflected at the reflecting surface of the deflecting section and converges the laser beams in a slow scanning direction, and that can adjust positions, in the slow scanning direction, of the laser beams that the first optical element reflects;
    a second optical element that converges, in the slow scanning direction, the laser beams reflected at the first optical element, and that can adjust scan line tilt of the laser beams that the second optical element reflects; and
    a reflecting member that is planar and is provided on an optical path between the first optical element and the second optical element, and reflects, toward the second optical element, the laser beams converged in the slow scanning direction by the first optical element, the reflecting member having an adjusting mechanism that can adjust an angle of incidence in the slow scanning direction of the laser beams that are incident on the second optical element, wherein the reflecting member is supported by a first contact portion and a second contact portion that contact one surface of the reflecting member, a third contact portion that contacts another surface of the reflecting member, and an urging member that urges the reflecting member toward the first contact portion, the second contact portion and the third contact portion, and the adjusting mechanism adjusts the angle of incidence in the slow scanning direction of the laser beams that are incident on the second optical element by causing the third contact portion to advance or withdraw with respect to the reflecting member thereby to rotate the reflecting member with a rotation center line which is a straight line that connects the first contact portion and the second contact portion.

2. The optical scanner of claim 1, wherein positions of the first contact portion, the second contact portion and the third contact portion are determined such that a center of gravity of the reflecting member is disposed within a triangle that is formed by connecting the first contact portion, the second contact portion and the third contact portion.

3. The optical scanner of claim 1, wherein:
the reflecting member is formed in a shape of a rectangle whose longitudinal direction is a fast scanning direction,
the first contact portion is provided at one side in the longitudinal direction of the reflecting member, and on a central line extending in the fast scanning direction of the reflecting member,
the second contact portion is provided at another side in the longitudinal direction of the reflecting member, and at a position away from the central line toward one side in a widthwise direction of the reflecting member, and
the third contact portion is provided at the other side in the longitudinal direction of the reflecting member, and at a position away from the central line toward another side in the widthwise direction of the reflecting member.

4. The optical scanner of claim 3, wherein positions of the first contact portion, the second contact portion and the third contact portion are determined such that a triangle, that is formed by connecting the first contact portion, the second contact portion and the third contact portion, is an isosceles triangle whose vertex is the first contact portion.

5. The optical scanner of claim 3, wherein the urging member is provided at the one side in the longitudinal direction of the reflecting member, and at a position substantially at a point symmetry with respect to the third contact portion with the center of gravity of the reflecting mirror being a reference.

6. An image forming device comprising:
an optical scanner;
an image carrier in which laser beams emitted from the optical scanner are illuminated onto a surface to be scanned at an outer periphery of the image carrier, and an electrostatic latent image is formed on the surface to be scanned; and
a developing device that develops the electrostatic latent image formed on the surface to be scanned of the image carrier, and makes the electrostatic image visible as a toner image, the optical scanner including:
a light source that emits a plurality of the laser beams;
a deflecting section that includes reflecting surfaces on each of which the plurality of laser beams emitted from the light source are incident, and that moves the reflecting surfaces to deflect the laser beams that are incident on the reflecting surface;
a first optical element that reflects the plurality of laser beams deflected at the reflecting surface of the deflecting section and converges the laser beams in a slow scanning direction, and that can adjust positions, in the slow scanning direction, of laser beams that the first optical element reflects;
a second optical element that converges, in the slow scanning direction, the laser beams reflected at the first optical element, and that can adjust scan line tilt of the laser beams that the second optical element reflects; and
a reflecting member that is planar and is provided on an optical path between the first optical element and the second optical element and reflects, toward the second optical element, the laser beams converged in the slow scanning direction by the first optical element, the reflecting member having an adjusting mechanism that can adjust an angle of incidence in the slow scanning direction of the laser beams that are incident on the second optical element; wherein
the reflecting member is supported by a first contact portion and a second contact portion that contact one surface of the reflecting member, a third contact portion that contacts another surface of the reflecting member, and an urging member that urges the reflecting member toward the first contact portion, the second contact portion and the third contact portion, and
the adjusting mechanism adjusts the angle of incidence in the slow scanning direction of the laser beams that are incident on the second optical element by causing the third contact portion to advance or withdraw with respect to the reflecting member thereby to rotate the reflecting member with a rotation center line which is a straight line that connects the first contact portion and the second contact portion.

7. The image forming device of claim 6, wherein:
the reflecting member is formed in a shape of a rectangle whose longitudinal direction is a fast scanning direction,
the first contact portion is provided at one side in the longitudinal direction of the reflecting member, and on a central line extending in the fast scanning direction of the reflecting member,
the second contact portion is provided at another side in the longitudinal direction of the reflecting member, and at a position away from the central line toward one side in a widthwise direction of the reflecting member, and
the third contact portion is provided at the other side in the longitudinal direction of the reflecting member, and at a position away from the central line toward another side in the widthwise direction of the reflecting member.

8. The image forming device of claim 7, wherein positions of the first contact portion, the second contact portion and the third contact portion are determined such that a triangle, that is formed by connecting the first contact portion, the second contact portion and the third contact portion, is an isosceles triangle whose vertex is the first contact portion.

9. The image forming device of claim 7, wherein the urging member is provided at the one side in the longitudinal direction of the reflecting member, and at a position substantially at a point symmetry with respect to the third contact portion with the center of gravity of the reflecting mirror being a reference.

* * * * *